United States Patent [19]
Heilmann et al.

[11] Patent Number: 5,783,269
[45] Date of Patent: Jul. 21, 1998

[54] NON-PVC MULTILAYER FILM FOR MEDICAL BAGS

[75] Inventors: Klaus Heilmann, St. Wendel, Germany; Thomas Nicola, Spicheren, France; Thomas Kreischer, Saarbrucken, Germany

[73] Assignee: Fresenius AG, Germany

[21] Appl. No.: 638,249

[22] Filed: Apr. 26, 1996

[30] Foreign Application Priority Data

Apr. 26, 1995 [DE] Germany ............ 195 15 254.9

[51] Int. Cl.$^6$ ............................................. B32B 1/08
[52] U.S. Cl. ............ 428/35.2; 428/35.7; 428/35.9; 428/349; 428/515; 428/516; 428/517; 428/519; 428/521
[58] Field of Search ................. 428/515, 516, 428/517, 519, 521, 35.2, 35.7, 35.9, 349

[56] References Cited

U.S. PATENT DOCUMENTS 4,405,667  9/1983  Christensen et al. ............ 428/35
4,643,926  2/1987  Mueller ............................. 428/35

FOREIGN PATENT DOCUMENTS

0179639A2  10/1985  European Pat. Off. .
0474376A2   8/1991  European Pat. Off. .
3305198A1   2/1983  Germany .

Primary Examiner—E. Rollins Buffalow

[57] ABSTRACT

Non-PVC multi-layer film (1) containing an outer layer (2), a supporting layer (4) together with at least one interposed central layer (3), characterized in that the outer (2) and supporting (4) layers contain polymers having Vicat softening temperatures of above approximately 121° C. and that at least one central layer (3) contains polymers having softening temperatures of below approximately 70° C. The non-PVC multi-layer film (1) is particularly suitable for the production of medical bags, in particular multi-chamber bags, as the materials of the individual layers (2–4) are selected in such a manner that the film is transparent and flexible, but in particular also heat-sterilizable, fusible and heat sealable. The film is moreover completely recyclable.

19 Claims, 1 Drawing Sheet

NON-PVC MULTILAYER FILM FOR MEDICAL BAGS

TECHNICAL FIELD OF THE INVENTION

This invention relates to a non-PVC multi-layer film containing an outer layer, at least one central layer, a supporting layer and optionally a sealing layer, wherein all the layers are substantially free of PVC and preferably contain polyolefin homopolymers and/or polyolefin copolymers as their substantial constituents. This invention moreover relates to a process for the production of the multi-layer film and to the use thereof.

BACKGROUND OF THE INVENTION

Multi-layer films have been widely used for many years. Multi-layer films are thus, for example, used in the food industry to package foodstuffs. Multi-layer films have also, however, long been used in the medical sector, for example for the production of medical bags.

The multi-layer films for these bags have hitherto mainly been produced from polyvinyl chloride (PVC). The use of polyvinyl chloride does, however, entail some disadvantages. There is thus a risk that the plasticisers contained in the PVC film may be released and, in the event that the films are used in medical bags, may diffuse into the medical solution contained therein. There is also the problem that hydrochloric acid is formed on heat sealing. PVC moreover has a tendency to absorb pharmaceutical preparations in infusion solutions.

Due to these disadvantages, other materials are increasingly being used for multi-layer films.

The following documents are cited as relevant prior art
EP-A-0 179 639=D1,
EP-A-0 474 376=D2 and
U.S. Pat. No. 4,643,926=D3.

EP-A-0 179 639 thus describes a multi-layer film which contains, for example, two outer layers and one inner layer, wherein the outer layers are each a blend of at least one propylene-based polymer and at least one linear low density polyethylene (LLDPE) and the inner layer contains at least one polymer with elevated gas barrier properties. An ethylene/vinyl alcohol copolymer (EVOH) is, for example, used as the polymer having, elevated gas barrier properties.

A disadvantage of the multi-layer films known from D1 is that, due to the content of LDPE in the outer layer blend, heat resistance may be insufficient under sterilization conditions. Moreover, the film known from D1 with a central gas barrier layer (i.e. E>2000) may be assumed to have inadequate impact strength.

A multi-layer film having a total of 5 or 7 layers is disclosed in D2. This multi-layer film has an inner layer together with two outer layers. A further one to two layers may be arranged between each of the outer layers and the inner layer. The inner layer contains a blend of a) a propylene homopolymer or copolymer and b) an ethylene copolymer or polybutene. Both outer layers are heat-sealable and contain a plasticiser Styrene/butadiene copolymers are inter alia used as the material for the outer layers. The multi-layer film according to D2 firstly has a symmetrical structure with two heat-sealing layers. Furthermore, a plasticiser is required for both styrene-butadiene copolymers and the outer layers of the film according to D2 also have no defined softening point. A layer acting as a supporting layer is also missing according to D2. All in all, the film according to D2 thus has a somewhat unfavorable structure, which may in particular result in 1) pool transparency, 2) adhesion of the outer layers, for example in a medical bag under sterilization conditions, 3) a highly complex heat sealing process due to the symmetrical structure, 4) inadequate film strength at 121° C. and, finally, 5) disposal problems due to the combination of materials.

U.S. Pat. No. 4,643,926 also discloses a multi-layer film. The layered films of D3 have a heat sealing layer of ethylene-propylene copolymer, modified ethylene-propylene copolymer or flexible copolyester, one or more inner layers which include elastic polymeric materials and an outer layer of ethylene-propylene copolymer or a flexible copolyester. The inner film layers (central or inner layers) here lack a supporting layer such that the inner or central layer(s) of the multi-layer film flow on heat-sealing. Moreover, on the basis of current knowledge, the presence of at least one coupling layer is necessary between the layers of the disclosed material combinations. Substances which may be considered for this purpose are, for example, an ethylenemethacrylate copolymer (EMA), or an ethylene-vinyl acetate copolymer (EVA), which, however, in turn disadvantageously means that, unless it is radiation crosslinked, the film cannot be sterilized by heat. Finally, the material selection disclosed according to D3 would also suggest that there may be disposal problems associated with the used films.

SUMMARY OF THE INVENTION

In the light of the above-stated prior art and the disadvantages associated therewith, the object of the invention was thus to provide an impact resistant, heat sterilizable, flexible film with the greatest possible transparency, which should contain neither PVC nor plasticisers, should as far as possible consist of easily disposable materials and which moreover allows the production of medical bags or multi-chamber bags and the like, which thus in particular still have elevated impact resistance even after sterilization.

A further object of the invention is to provide a process for the production of such a multi-layer film and the use of the film.

By means of a non-PVC multi-layer film which has an outer layer, a supporting layer, together with at least one central layer, the outer and supporting layers having polymers with Vicat softening temperatures of above approximately 121° C. and at least one central layer which contains polymers having softening temperatures of below approximately 70° C., it is possible to provide a multi-layer film which is excellently suited to applications in the medical sector, especially for contact with medical solutions or body fluids, which film is furthermore autoclavable, flexible and optically clear. The films according to the invention are moreover impermeable or only slightly permeable to water vapour and, finally, the non-PVC multi-layer film according to the invention has excellent welding and heat sealing properties, so emphasizing its suitability for the production of medical bags. The film moreover has outstandingly high impact resistance to absorb impact energy without destruction.

According to the invention, a non-PVC multi-layer film thus essentially has at least three layers, each of which performs specific functions. The core of the multi-layer structure according to the invention is an internal layer, which has previously also been referred to as the central layer, which imparts elevated flexibility to the finished film. In accordance with its function, the central layer may thus also be described as the flexibilizing layer. The at least one central layer according to the invention is necessarily bounded according to the invention by two adjacent layers, at least one on each side, and is thus arranged between two outer layers.

SUMMARY OF THE INVENTION

The softening temperature for the polymer and plastic materials of the invention is determined to Vicat VST/A/50, i.e. it is defined as the temperature at which a steel pin of a cross-section of 1 mm² has penetrated to a depth of 1 mm into a gradually heated plastic specimen under a load of 10 N according to method A (formerly: DIN 53460, now DIN-ISO standard 306, ASTM D1525). The softening temperature is generally substantially lower than the temperature at which the polymeric material would completely reach a semi-liquid state. Thus, when partially crystalline polymers used according to the invention are heated, the amorphous regions begin to flow, while the crystalline regions retain their structure.

It may be assumed on this basis that polymers having softening temperatures, of less than approximately 70° C. will generally impart to the central layer, with regard to its melting behavior, the property that it will melt at temperatures of <121° C. Melting should here not be taken to mean that the central layer passes completely into the liquid state of aggregation, but that partial gelation of the central layer occurs at temperatures of around 121° C., wherein sufficient regions of the central layer remain in the solid state of aggregation and ensure dimensional stability combined with excellent flexibility of the entire film.

The layers bounding the central layer, namely the outer layer and the supporting layer may be different or identical. It is, however, essential for the purposes of the invention that these layers contain polymers having softening temperatures of above approximately 121° C., the particular layer thus generally being imparted with behavior with regard to its melting characteristics which may be described as high melting, i.e., within the meaning of the invention, melting at temperatures of >121° C. With regard to their function, both layers act according to the invention to support and stabilize the internal central layer.

Although the combination of three layers (supporting layer, central layer and outer layer) already gives rise to a non-PVC multi-layer film with good service properties, in a further development according to the invention, the central layer may have at least two layers with a low softening temperature, wherein the layers with low softening temperatures contain polymers having softening temperatures of below approximately 70° C. These are separated by a layer having an elevated softening temperature which contains polymers having softening temperatures of above approximately 121° C., wherein the layers of lower and higher softening temperature are arranged alternately. This means that the internal central layer may be divided into two or more supporting and central layers, such that the non-PVC multi-layer film according to the invention has at least three layers, but may also have 5, 7 etc. layers. This multi-layered nature of the central layer does not deviate from the basic concept of the invention, but instead the overall structural flexibility of the complete film is distinctly improved by the division of the central layer. In a 5 or 7 layered structures, the three or five inner layers may have, for example two or three layers with polymers which impart an overall softening temperature of <121° C. to the layers containing them, while in the first case a layer with one of more polymers having softening temperatures of >121° C. is arranged between the two central layers and in the second case two such layers are arranged between the three central layers in order to provide support.

It is thus ensured in either case that a central layer always has adjacent to it layers having a softening temperature of >121° C. or which contain polymers having a Vicat softening temperature of >121° C. (VST/A/50(10N)).

The thickness of the individual layers of the non-PVC multi-layer film according to the invention is not per se particularly critical. It is, however, preferred according to the invention for the central layer to be at least 90 μm thick and for the outer and supporting layers each to be 10–20 μm thick. Despite their relatively low thickness, the outer and supporting layer ensure, by virtue of their supporting properties, that deformation of the relatively flexible and thick central layer due to the increase flow of the central layer under the action of heat is very largely avoided.

If a 5 or 7 layer structure is used for the multi-layer film instead of the basic 3 layer structure, the values stated for the 3 layer structure may in principle be retained for the individual layers. It is, however, equally possible and usually preferred to reduce the thickness of the individual layers included in the structure of the central layer, in order to keep the total thickness of three or five "central layers" in the region of approximately 100 μm.

In another convenient development, the non-PVC multi-layer film according to the invention additionally has a heat sealing layer. This is preferably arranged as the outermost layer on the outer supporting layer. In this manner, it is advantageously possible to weld the multi-layer film of the invention on this side. The polymers used for the heat sealing layer are generally compatible with solutions, because, once a bag has been produced from the non-PVC multi-layer film according to the invention, the heat sealing layer is on the inside. The polymers should also be very readily heat-sealable so that a good and strong seam may be produced. In this way, a 4, 6, 8 etc. structure is produced, so giving an asymmetrical film.

In a preferred embodiment, the heat sealing layer contains polymers having a softening temperature below the softening temperatures of the outer layer, the supporting layer and the at least one layer of an elevated softening temperature which is arranged between "two central layers". The heat sealing layer is conveniently 15–30 μm thick. It is simultaneously advantageous for the purposes of the invention if the plastic material of the heat sealing layer has a softening temperature of >121° C. It should in particular be noted that the heat sealing layer may very well contain rubber in order to achieve the desired properties. The heat sealing layer is preferably impact modified by at least 15% synthetic rubber. In either case, however, it is advantageous if the plastic material for the heat sealing layer is selected such that the material of the layer remains dimensionally stable under steam sterilization conditions, i.e. at approximately 121° C.

As already mentioned, selection of the materials for all the layers of a non-PVC multi-layer film according to the invention is essentially guided by the softening temperatures of the polymers contained in the individual layers consisting of plastic materials.

It should be noted at this point that, for the purposes of the invention, "plastic material" is taken to mean those materials the substantial constituents of which consist of macromolecular organic compounds, wherein the plastic materials are also described as polymers, including in particular both homopolymers and copolymers (random, block and/or graft polymers) as well as mixtures (=blends) of the above-stated substances.

In addition to the softening temperatures of the polymers and thus of the plastic materials of the individual layers, the environmental compatibility of the materials used for the individual layers also plays a significant part in the invention.

Materials which have hitherto been used, in particular PVC, are associated with many disadvantages due to environmental problems (HCI, dioxin, furan), the release of added plasticisers and inadequate recyclability.

A very particularly preferred embodiment of the non-PVC multi-layer film according to the invention is characterized in that all the layers included in the structure of the film contain polyolefin homopolymers and/or polyolefin copolymers which are α-olefinically linked as their substantial constituents. The use of such materials gives rise according to the invention to a multi-layer film which is entirely fit for medical applications and is nevertheless completely environmentally compatible as it may be recycled.

While known polyolefin films have not been able to fulfill the relevant requirements with regard to their flexibility or clarity, all these criteria are satisfied according to the invention.

Materials which may be considered for the outer layer are polymers or polymer mixtures familiar to the person skilled in the art having a softening temperature which is higher than that of the polymers or polymer mixtures of the other layers or is equal to the softening temperature of the polymer or polymer mixtures of the supporting layer(s).

These preferably included polypropylene homopolymers, polypropylene block copolymers, polypropylene random copolymers with a low to moderate ethylene content, and/or high density polyethylene (HDPE). Polypropylene random copolymers are particularly preferred. The stated polymers may be used alone or as mixtures or blends.

Materials which may be considered for the central layer or the at least one layer having a low softening temperature of the central layers are in particular polyethylene copolymers, polypropylene homopolymers or copolymers with Q<0.9 g/cm³, low density polyethylene (LDPE), styrene-ethylene/butylene-styrene block copolymers, styrene-ethylene/propylene-styrene block copolymers, SIS (styrene-isoprene-styrene), polyisobutylenes (PIBS) and/or blends of the stated polymers with polypropylene with Q≧0.9 g/cm³ and/or polyethylene.

The supporting layer and/or the at least one layer having an elevated softening temperature advantageously consist of a polypropylene homopolymer, a polypropylene copolymer, a high density polyethylene (HDPE) or a linear low density polyethylene (LLDPE) and/or blends of the stated polymers.

Materials which may in particular be considered for the heat sealing layer are polypropylene copolymers, high density polyethylenes (HDPEs), linear low density polyethylenes (LLDPE) and/or blends of the stated polymers with a styreneethylene/butylene-styrene block copolymer, a styrene-ethylene/propylene-styrene block copolymer, SIS (styrene-isoprene-styrene block copolymers) and/or an α-olefin copolymer, preferably prepared from a blend of a polypropylene random copolymer and a synthetic rubber.

As already explained, the polymer materials for the individual layers are preferably polyolefins. The multi-layer film according to the invention is very particularly preferably characterized in that it may be substantially free of lubricants, plasticisers, anti-blocking agents, anti-static agents and other fillers. It should in particular be emphasized in this connection that adequate adhesion may in principle be assumed to exist between the individual layers of the different materials. Adhesion between the layers may, however, advantageously be increased by the individual layers' each additionally containing up to 70 wt. %, relative to 100 wt. % of their composition, of those plastic materials used to constitute one or both of the adjacent layers of the non-PVC multi-layer film.

This "material mediation" or the replacement of material distinctly increases the compatibility of the layers which have together been shaped into a film without impairing the remaining properties. This "fading in" in particular ensures good mutual adhesion of the layers without a coupling agent being necessary.

The non-PVC multi-layer film of the invention may in principle be formed using shaping processes familiar to the person skilled in the art. According to the invention, production as a flat or tubular (blown) film is preferred.

The present invention also provides a process for the production of the non-PVC multi-layer film, which process is characterized in that the individual layers are coextruded together to obtain the non-PVC multi-layer film. invention is here that it is possible by coextruding two or more layers together to combine two or more desired properties in a single film, so increasing the quality of the resultant product.

The coextrusion process makes it possible, if suitable extrusion partners are selected, to provide a tailor-made multi-layer film which, uniquely, makes it possible to dispense with the addition of coupling agents and nevertheless to influence the required properties and additionally other important properties, such as gas and water vapour permeability, material strength, weldability, transparency and heat resistance.

While the coextrusion of materials of the layers according to the invention is indeed known in principle, it was not predictable on the basis of past experience that such a complex multi-layer film of the type according to the invention could straightforwardly be achieved with success. That it was successful according to the invention is surprising to the extent that practical experience has repeatedly shown that, even with the assistance of sometimes tabulated polymer properties, such as composite adhesion data, the use of such materials does not necessarily lead to success. In other words, solving a particular problem in a multi-layer coextruded film by simply making a selection from known materials is not in principle straightforwardly possible.

It is also possible in the process according to the invention for the film, once actually formed, to be further processed in the conventional manner. It may thus, for example, be stretched. Preferably, however, it is quenched with water after forming. By this means, an optimum composite with elevated flexibility and sufficient toughness is obtained, but in particular quenching the film improves the transparency of the film, because crystallization of the polymers included in the structure of the film, which occurs on slow cooling, is prevented. This results in a low degree of crystallinity and thus to elevated transparency and toughness.

The non-PVC multi-layer film according to the invention is excellently suited to use in the medical sector. The materials of the individual layers of the multi-layer film are all selected such that the film is transparent and flexible, but also heat sterilizable, fusible and heat sealable. The use of PVC, which always contains a proportion of plasticisers, is avoided and no coupling agents are required, which could possibly diffuse through the layers of plastic material, which is particularly undesirable in medical applications.

By virtue of its outstanding material and service characteristics, the non-PVC multi-layer film according to the invention is particularly advantageously used for the production of medical bags or medical multi-chamber bags.

DESCRIPTION OF THE PREFERRED EMBODIMENT

Figure 1:
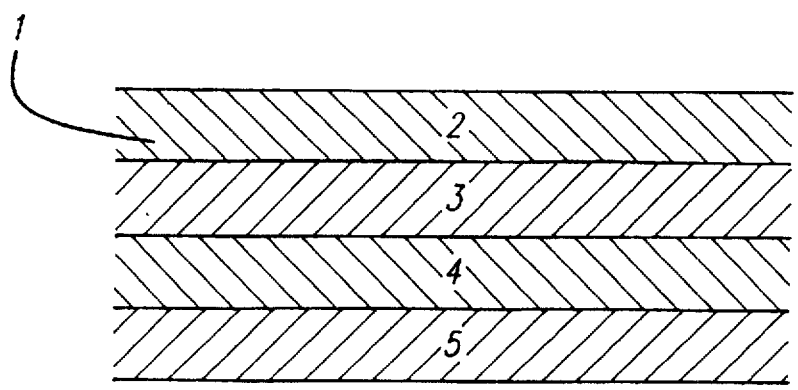
FIG. 1 a schematic cross-section through a first embodiment of the non-PVC multi-layer film according to the invention with a heat sealing layer.

FIG. 1 shows a cross-section of a first embodiment of a non-PVC multi-layer film 1 according to the invention. The film was produced by coextrusion and a total of four layers, 2, 3, 4 and 5 may be seen. Layer 2 is the outer layer, layer 3 the central layer, layer 4 a supporting layer and layer 5 a heat sealing layer.

Figure 2:
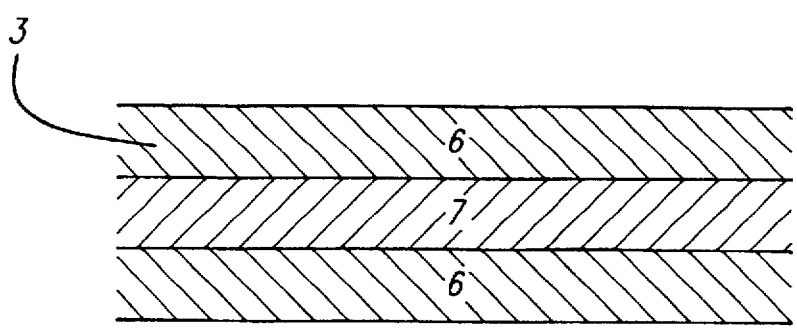
FIG. 2 a schematic cross-section through a second embodiment of the non-PVC multi-layer film according to the invention, wherein for simplicity's sake only the structure of layer 3 from FIG. 1 is shown with an otherwise unchanged structure.
Figure 3:
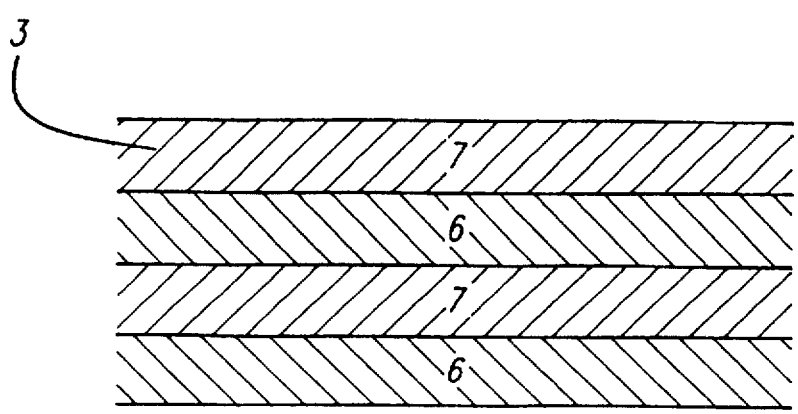
FIG. 3 a schematic cross-section through a third embodiment of the non-PVC multi-layer film according to the invention, wherein for simplicity's sake the outer, supporting and heat sealing layers from FIG. 1 have also been omitted.
Figure 4:
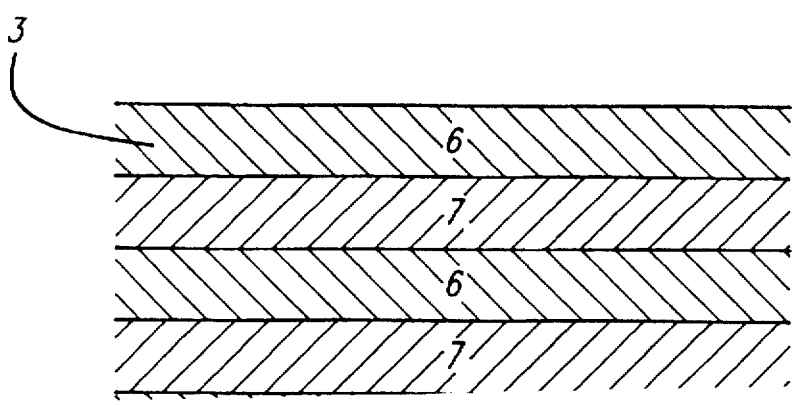
FIG. 4 a schematic cross-section through a fourth embodiment of the non-PVC multi-layer film according to the invention, wherein again only the central layer 3 according to FIG. 1 is shown in enlarged form and the outer layer and the supporting and heat sealing; layers have been omitted for simplicity's sake.

According to the invention, the central layer 3 may be divided into two or more layers 6 and 7. This is most easily seen in FIG. 2–4, which show an enlargement from FIG. 1 of the central layer omitting layers 2, 4 and 5. Layers 4 and 7 may have the same polymer structure.

Outer layer 2 conventionally consists of a polymer or a polymer mixture having a melting point higher than the melting point of the polymers or polymer mixtures of the other layers or equal to the melting point of supporting layer 4. The polymer or polymer mixture of the outer layer 2 is generally determined in accordance with the welding temperature of the heat sealing layer 5, such that when the outer layer and the welding tool come into contact the outer layer 2 melts or bonds.

The central layer 3 is preferably a soft or flexible layer which has a softening point or one of the constituents has a softening point below the sterilization temperature of 121° C. and which may be divided by one or more layers 7 into identical or different layers 6. The layers 7 consist of polymers or contain polymers having melting points of distinctly above 121° C. During sterilization, the layers 7 form a matrix with the outer layer 2 and supporting layer 4, which matrix prevents the layers 6 from flowing. Layers 6, 7 and 4 may also have properties which promote bonding to the adjacent layer.

The supporting layer 4 assumes the function of a flow barrier during the welding process. It conventionally consists of polymers or polymer mixtures having a softening point above the particular welding temperature.

The heat sealing layer 5 conventionally consists of a readily heat sealed polymer or polymer mixtures, which are appropriately suitable for contact with foodstuffs, enteral or parenteral solutions.

TEST RESULTS

A) An example film according to the invention may be produced inter alia by the selection and coextrusion of the following materials with the following properties:

a) Outer layer 2 Novolen 1302 L (atactic polypropylene homopolymer with a Vicat A of 138° C.), Novolen 1102 H (isotactic polypropylene homopolymer with a Vicat A of 154° C.), PP 23 M 10 cs 259 (polypropylene random copolymer with a Vicat A of 135° C.);

b) Central layer 3, Teamex 1000 F (VLDPE with Vicat A=66° C), Exxact 4024 (polyethylene copolymer with Vicat A=70° C.), Adflex 7029 XCP (polypropylene copolymer with Vicat A=55° C.)

c) Supporting layer 4 as a)

d) Heat sealing layer 5 Novolen 3200 HX (polypropylene random copolymer with Vicat A=130° C.).

B) In another test, the impact strength of a non-PVC multi-layer film according to the invention was investigated by a drop test. An Example shows the behavior of an impact resistant multi-layer film according to the example before and after steam sterilization in a drop test from a height of 1 and 2 m.

The test specimen is a coextruded multi-layer film of the following structure: Seven layer composite according to FIG. 1 and 3 with PP-H as outer layer 2; PP-C/PP blend as layer 6; PE-C according to layer 7; PP-H as supporting layer 4; PP-R/SEBS blend as heat sealing layer 5

The percentage constituent proportions (wt. %) of the whole film are as follows:

28% PP-H 60% PE/PP blend 12% impact modified PP-R.

The material abbreviations have the following meanings:
PP-H,R: polypropylene homopolymer, random copolymer SEBS: styrene-ethylene-butylene-styrene block copolymer PE-C: polyethylene copolymer The film was coextruded and wound as a tubular film with a flat width of 180 mm and a film thickness of 140–150 μm.

The film is slightly biaxially oriented during the production process at a stretching ratio of: longitudinal stretching/ transverse stretching =2.3/1.4.

The films according to the invention and materials for films according to the invention thus differ distinctly from known prior art materials. The LLDPE described in D3 for example is suitable for heat shrinkable films. LLDPE is a linear polymer. At the largest $C_8$ residues are copolymerized onto a linear chain. LLDPE thus gives rise to oriented films. In general, such films are stretched by more than 40 times and thus have the characteristic of shrinking contrary to the direction of stretching on heat treatment. This characteristic is not exhibited by a film usable according to the invention. While this film may indeed be slightly oriented (4:1), it is not stretched (>40:1). It is thus not linearly oriented and exhibits no shrink properties.

The tubular film sample is cut into appropriate lengths and these are permanently welded together by indirect hot contact welding or laser welding (the type of welding is not critical) to produce a bag with two flexible tube connections and then filled to the same level with water as incompressible pack contents. Both tube connections are tightly sealed with plug connectors.

Optimum parameters, such as temperature, time, surface pressure, for the welding were determined in prior testing. These are shown in the following table:

| Temperature | Time [s] a | b | Surface pressure [N/m²] a | b | Pack contents Water [l] |
|---|---|---|---|---|---|
| 130 | 6 | 8 | 8 | 9 | 2 |

The film is welded in a welding apparatus with two welding bars heated with heating elements.

a) Welding bar exactly beneath seam b) Welding bar for welding connection tubes.

One half of the finished bags are sterilized and the other half not. Sterilization is performed in an autoclave under wet steam at 121° C. for 35 minutes.

The drop tester allows any height up to 2 m to be set. It has a pneumatically actuated clamp which receives the bag and is opened when pressure is applied. The bags lie belly side up, so that impact occurs in the unfavorable belly side position.

It is found that the effect of sterilization is not perceptible from any decrease in impact strength. No decrease in the frequency of dropping occurs either. The only difference is that the samples fail at different points. While damage preferentially occurs to the film before sterilization, the weld seam is the weak point after sterilization. One possible reason for this behavior lies in the increasing degree of crystallization and the formation of spherulitic superstructures resulting in a loss of toughness.

In the investigated film, the heat sealing layer was impact modified with PP-R/SEBS blend. The improvement in impact strength is achieved by the rubber content as a discontinuous phase in a PP-R matrix. Provided that the two blend components have good compatibility, the rubber phases are capable of absorbing stress in the brittle PP-R matrix, so ensuring greater elasticity.

However, the central layer 3 is by far the most important with regard to drop resistance. Provided that seam strength is sufficient, the energy introduced into the material on impact must be absorbed. The tested film has an elevated content of PE/PP blend as the central layer. The energy absorbed may be determined from the law of conservation of energy as follows:

$W = m * g * (h_1 - h_2)$ $h_1$ = drop height $h_2$ = rebound height m = bag weight g = acceleration due to gravity The rate at which the samples are loaded must also be taken into account, giving the velocity of the bag before impact.

$$v = \sqrt{2 * g * h_1}$$

(disregarding air resistance)

The test specimens behave partially elastically in the drop test giving a rebound eight $h_2$ of 10–20 cm, so the impact must be assumed to be partially elastic.

The loading does not cause failure in the samples. Due to the elevated rates of loading and the slight expansion of the samples, it may reliably be stated that loading; occurs within the energy-elastic range (Hooke's range).

The tensile impact strength of the film described in B) above was also measured:

Tensile impact strength measurement was performed with a model 6545/023 universal pendulum hammer from the company Ceast (Turin, Italy). The principle of the measurement is based on the conversion of potential energy into kinetic energy. A film sample (see below for dimensions) is clamped such that, as the pendulum hammer passes through the zero position, it applies a tensile impact load on the film. The energy arising from the destruction of the film is calculated as the energy balance between the potential energy before and after destruction of the sample, by determining the initial excursion h1 from the zero position of the pendulum and the final excursion h2 after failure of the sample.

The following apply: Epot1=m * g * h1 Epot2=m * g * h2 so giving the damage energy: Es=Epot1−Epot2

The measurements were performed with an excursion of 90° C. from the zero position. Potential energy Epot1 was always 15 J. The tester is equipped such that the tensile impact strength values are calculated on completion of the test. Specifically, the tester was operated with the following settings or exhibited the following characteristics:

DRWG number (cod.): 6545/023 Potential energy: 15 J Weight measured at 90° C.: 2181.7–2203-6 g Distance between rotation and impact axes: 373.8±0.1 mm Time for 50 oscillations of less than 5°=60.98–61.59 s The tensile impact strength of a film according to the invention (unsterilized, four 0.15 mm samples a in each instance clamped together with a thickness of 4×0.15 mm, with a test specimen width of 4 mm and a perpendicular cross-section of 0.56 mm²) was 12935.8 mJ/mm²). When sterilized, the tensile impact strength value was 5560.3 mJ/mm².

(Thickness: 4×0.14 mm, width unchanged, cross-section: 0.56 mm²).

A hitherto used PVC film conventionally exhibits a tensile impact strength of the order of 7150 mJ/mm² (unsterilized) or 6973 mJ/mm² (sterilized). It may thus be concluded that, even after sterilization, the film according to the invention satisfies all requirements for particularly high tensile impact strength.

Determination of evaporation residue to DIN 58363, part 15 (July 1982). A further, not insignificant, advantage may be considered to be the low additive migration value. In a PVC film, additive loss on sterilization is 0.55 mg/dm², but only 0.1 mg/dr² in a film according to the invention (at 121° C.), measured using the evaporation residue to DIN 58363.

Further advantages and embodiments of the invention may be found in the following patent claims.

We claim:

1. Non-polyvinyl chloride multi-layer film (1) comprising an outer layer (2), a supporting layer (4) together with at least one interposed central layer (3), characterised in that the outer (2) and supporting (4) layers comprise polymers having softening temperatures of above approximately 121° C. at least one central layer (3) comprises polymers having softening temperatures of below approximately 70° C., and the ratio of the thickness for the outer layer (2) to central layer (3) to supporting layer (4) is within the range of 1:9:1 and 1:4.5:1.

2. Non-polyvinyl chloride multi-layer film according to claim 1, wherein the central layer (3) comprises at least two layers (6), which comprise polymers having softening temperatures of below approximately 70° C. and at least one layer (7), which comprise polymers having softening temperatures above approximately 121° C., wherein each two layers (6) are each separated by a layer (7).

3. Non-polyvinyl chloride multi-layer film according to claim 1, wherein the central layer (3) is at least 90 μm thick and the outer (2) and supporting (4) layers are each 10–20 μm thick.

4. Non-polyvinyl chloride multi-layer film according to claim 1, wherein the multi-layer film additionally comprises a heat sealing layer (5).

5. Non-polyvinyl chloride multi-layer film according to claim 4, wherein the heat sealing layer (5) comprises polymers having softening temperatures below the softening temperatures of the outer layer (2), the supporting layer (4) and the at least one layer (7).

6. Non-polyvinyl chloride multi-layer film according to claim 4, wherein the heat sealing layer (5) is 15–30 μm thick.

7. Non-polyvinyl chloride multi-layer film according to claim 1, wherein all the layers comprise polyolefin homopolymers and/or polyolefin copolymers.

8. Non-polyvinyl chloride multi-layer film according to claim 1, wherein the multi-layer film is free plasticizers, anti-blocking agents, anti-static agents and other fillers.

9. Non-polyvinyl chloride multi-layer film according to claim 1, wherein the outer layer (2) comprises a polypropylene homopolymer, a polypropylene block copolymer, a polypropylene random copolymer with ethylene as a comonomer and/or a high density polyethylene (HDPE).

10. Non-polyvinyl chloride multi-layer film according to claim 2, wherein the central layer (3) or the at least one layer (6) having a softening temperature of the central layer (3) consists of a polyethylene copolymer, a polypropylene copolymer, a polypropylene homopolymer or copolymer with a density Q of <0.9 g/cm3, a low density polyethylene (LDPE), a styrene-ethylene/butylene-styrene block copolymer, a styrene-ethylene/propylene-styrene block copolymer, a styrene-isopren-styrene (SIS), a polyisobutylene (PIB) and/or blends of the stated polymers with polypropylene of a density Q of >=0.9 g/cm$^3$ and/or polyethylene.

11. Non-polyvinyl chloride multi-layer film according to claim 2, wherein the supporting layer (4) and the at least one layer (7) consist of a polypropylene homopolymer, a polypropylene copolymer, a high density polyethylene (HDPE) or a linear low density polyethylene (LLDPE) and/or blends of the stated polymers.

12. Non-polyvinyl chloride multi-layer film according to claim 1, wherein the heat sealing layer (5) consists of a polypropylene copolymer, a high density polyethylene (HDPE), a linear low density polyethylene (LLDPE) and/or blends of the stated polymers with a styrene-ethylene/butylene-styrene block copolymer, a styrene-ethylene/propylene-styrene block copolymer, styrene-isopren-styrene (SIS) and/or an α-olefin copolymer.

13. Non-polyvinyl chloride multi-layer film according to claim 1, wherein the multi-layer film is a flat or tubular film.

14. Process for the production of a non-polyvinyl chloride multi-layer film (1) according to claim 1, wherein the multi-layer film is produced by coextrusion.

15. Process for the production of a non-polyvinyl chloride multi-layer film (1) according to claim 14, wherein, once coextruded, the resultant film is quenched with water.

16. Non-polyvinyl chloride multi-layer film according to claim 9, wherein the outer layer (2) comprises a polypropylene random copolymer with ethylene as a comonomer.

17. Non-polyvinyl chloride multi-layer film according to claim 12, wherein the outer layer (2) consists of a blend of a polypropylene random copolymer with a styrene-isopren-styrene (SIS) block copolymer.

18. A medical bag comprising a non-polyvinyl chloride multi-layer film (1) according to claim 1.

19. A medical bag according to claim 18 wherein said medical bag does comprise a plurality of chambers.

* * * * *